2,835,665

MANUFACTURE OF BUTYRIC ACID ESTERS OF CELLULOSE USING A SULFURIC ACID CATALYST

Carl J. Malm, Leo J. Tanghe, and Loring W. Blanchard, Jr., Rochester, N. Y., assignors to Eastman Kodak Company, Rochester, N. Y., a corporation of New Jersey No Drawing. Application November 18, 1954
Serial No. 469,831

3 Claims. (Cl. 260—227)

This application relates to a method of making butyric acid esters of cellulose in which a cellulose which has been activated is treated with a mixture of acetic acid and sulfuric acid following which the acetic acid is removed and the cellulose is then ready for esterification. In the esterification it may be desirable in some cases to add additional catalyst in the form of perchloric acid near the end of the esterification to promote the obtaining of a well esterified product.

In the manufacture of isobutyric acid esters of cellulose of high isobutyryl content the use of sulfuric acid as the catalyst has not been considered to be very advantageous because the products obtained by conventional esterification methods exhibit high haze and low viscosity. This undesirable effect upon the cellulose is thought to be due to the slow effect of isobutyric anhydride in the transesterification of the sulfuric acid which first combines with the cellulose. This being the case it is important that when sulfuric acid is used as the catalyst in preparing isobutyric acid esters of cellulose it be thoroughly and uniformly distributed throughout the cellulose fibers prior to commencement of the esterification. In the usual methods of esterifying cellulose in which sulfuric acid catalyst is employed uniform distribution of the catalyst is not obtained.

One object of our invention is to provide a procedure for making butyric acid esters of cellulose in which excessive degradation of the cellulose is avoided but yet a sulfuric acid catalyst is employed. Another object of our invention is to provide a method for preparing butyric acid esters of cellulose in which sulfuric acid catalyst is employed, characterized by a uniform distribution of the sulfuric acid throughout the cellulose starting material. A further object of our invention is to provide a method of making butyric acid esters of cellulose in which perchloric acid catalyst may be added to the esterification mass near the end of the esterification to assure a product having desirable properties. Other objects of our invention will appear herein.

In the making of isobutyric acid esters of cellulose in accordance with our invention, in which isobutyric anhydride is used as the esterifying reagent, the cellulose is first activated by swelling the fibers thereof with water, and then removing the water with an organic liquid preferably acetic acid. This activation of cellulose may be carried out conveniently by passing fibrous cellulose in sheet form over suction boxes in which the cellulose sheet is sprayed with water either at ordinary or elevated temperature, and then with some organic liquid such as acetic acid. There is then obtained a cellulose material wet with acetic acid or other organic liquid which retains the cellulose in swollen condition. The cellulose thus resulting is treated with a solution of sulfuric acid in acetic acid whereby the sulfuric acid is evenly distributed in the cellulose. The solution of sulfuric acid in acetic acid may be of 1–10% strength. However, concentrations of 5% have been found to be usually satisfactory.

After this treatment the acetic acid is removed from the cellulose by displacing it with isobutyric acid whereby the sulfuric acid is retained on the cellulose in a uniformly distributed condition. In some cases a cellulose acetate isobutyrate is desired and for this purpose it may be that only some of the acetic acid is removed from the cellulose. After the removal of the acetic acid from the cellulose resulting in a product having sulfuric acid uniformly distributed therethrough there is then added at least 3½ parts of isobutyric anhydride together with any additional solvent such as isobutyric acid if the amount of isobutyric acid present already is not sufficient. The cellulose is esterified which procedure involves increasing the temperature up to a maximum of 100–110° F. Sometimes in the esterification of cellulose with isobutyric anhydride after 90% of the esterification is completed, the mass may appear to be in the form of a grainy paste probably due to the exhaustion of the sulfuric acid catalyst. In this case it is desirable to add perchloric acid in a proportion up to 10% of the original $H_2SO_4$ so as to result in a product having good haze and viscosity characteristics. In the making of isobutyric acid esters of cellulose if any acetyl is present in the esterification mass it is desirable that it constitute no more than 20% of the total acyl present in the mass. In the operations as described above, it is desirable after the removal of the water from the cellulose that no further water be added and particularly that the cellulose which is treated with isobutyric anhydride be substantially free of any water content. However, if moisture is present it is destroyed by isobutyric anhydride and may be compensated for by the addition of more of the anhydride than would ordinarily be necessary.

The following examples illustrate the preparation of isobutyric acid esters of cellulose in accordance with our invention:

Example 1

Cotton linters were activated by soaking in distilled water at 150° F. and the water was then displaced by two changes of acetic acid. The resulting material was then placed in an acetylation mixer in the amount of 0.8 lb. of activated cellulose wet with 0.9 lb. of acetic acid. There was added to the mass 4 lbs. of acetic acid containing 6 cc. of sulfuric acid. After running the mixer for 10 minutes with a jacket temperature of 60° F. the excess liquid was removed by centrifuging and the cellulose was then mixed with 2.4 lbs. of isobutyric acid and agitated for 10 minutes at a temperature of 60° F. The excess liquid was then removed by centrifuging and there was thereupon obtained cellulose in which sulfuric acid was uniformly distributed therethrough which cellulose was wet with isobutyric acid. This cellulose was placed in a Werner-Pfleiderer mixer and esterified by adding 3.2 lbs. of isobutyric anhydride thereto and raising the jacket temperature of the mixer from 70° to 100° F. over a period of 8½ hours. A mixture of 200 cc. of water and 800 cc. of acetic acid was added, the jacket temperature of the mixer being 110° F. The product obtained was precipitated and washed using distilled water. The product thus obtained had 0.8% hydroxyl, 13.2% acetyl and 38.8% isobutyryl content. The product had a sulfur content of 0.02% and an intrinsic viscosity of 0.95 in acetic acid solution.

Example 2

The above procedure was repeated except that at the end of 7.5 hours there was added to the esterification mass .1% of perchloric acid based on the weight of the cellulose. The mixing was continued for 1 hours whereupon a clear, viscous solution was obtained. The mass was then diluted with a mixture of water and acetic acid and precipitated and washed in distilled water, as described in the preceeding example.

The cellulose isobutyrates and cellulose acetate isobutyrates obtained by the procedure in accordance with our invention are useful for making cellulose ester products of various kinds which are characterized by an absence of any odor therein. For instance, the products obtained in accordance with our invention may be mixed with plasticizer and employed to prepare molded products having good water resistance and good stability. If desired, these esters may be dissolved in volatile solvents such as acetone, methylene chloride or the like and coated out in the form of sheeting or as protective coatings.

We claim:

1. A process for preparing an isobutyric acid ester of cellulose which comprises activating cellulose with water, displacing the water from the cellulose with acetic acid, treating the cellulose with a solution of sulfuric acid in acetic acid, the sulfuric acid being in sufficient amount to supply all of the sulfurc acid catalyst for the subsequent esterification, displacing substantially all of the acetic acid from the cellulose with a 4-carbon atom fatty acid the sulfuric acid being left uniformly distributed throughout the cellulose and, without the addition of further sulfuric acid, esterifying the cellulose with an esterification bath containing as the essential esterifying reagent therein isobutyric anhydride.

2. A process for preparing an isobutyric acid ester of cellulose which comprises activating cellulose with water, displacing the water therefrom with acetic acid, treating the cellulose with a solution of sulfuric acid in acetic acid the sulfuric acid being in sufficient amount to supply all of the sulfuric acid catalyst for the subsequent esterification, displacing substantially all of the acetic acid from the cellulose with a fatty acid of 4-carbon atoms the sulfuric acid being left uniformly distributed throughout the cellulose, without the addition of further sulfuric acid esterifying the cellulose with an esterification bath in which the essential esterifying reagent is isobutyric anhydride and after completion of 90% of the esterification adding to the bath perchloric acid in an amount not more than 10% by weight of the sulfuric acid employed and continuing the esterification to completion.

3. A process for preparing an isobutyric acid ester of cellulose which comprises activating cellulose with water, displacing the water with acetic acid, treating the cellulose with a solution of sulfuric acid in acetic acid the sulfuric acid being employed in sufficient amount to supply all of the sulfuric acid catalyst for the subsequent esterification, displacing substantially all of the acetic acid from the cellulose with isobutyric acid the sulfuric acid being left uniformly distributed throughout the cellulose and, without the addition of sulfuric acid, esterifying the cellulose with an esterifying bath containing isobutyric anhydride as the essential esterifying reagent therein.

References Cited in the file of this patent

UNITED STATES PATENTS

| | | |
|---|---|---|
| 2,048,685 | Clarke et al. | July 28, 1936 |
| 2,072,261 | Haney | Mar. 2, 1937 |
| 2,261,237 | Dreyfus | Nov. 4, 1941 |
| 2,487,892 | Richter et al. | Nov. 15, 1949 |
| 2,622,080 | Richter et al. | Dec. 16, 1952 |
| 2,646,429 | Malm et al. | July 21, 1953 |